Figure 1:
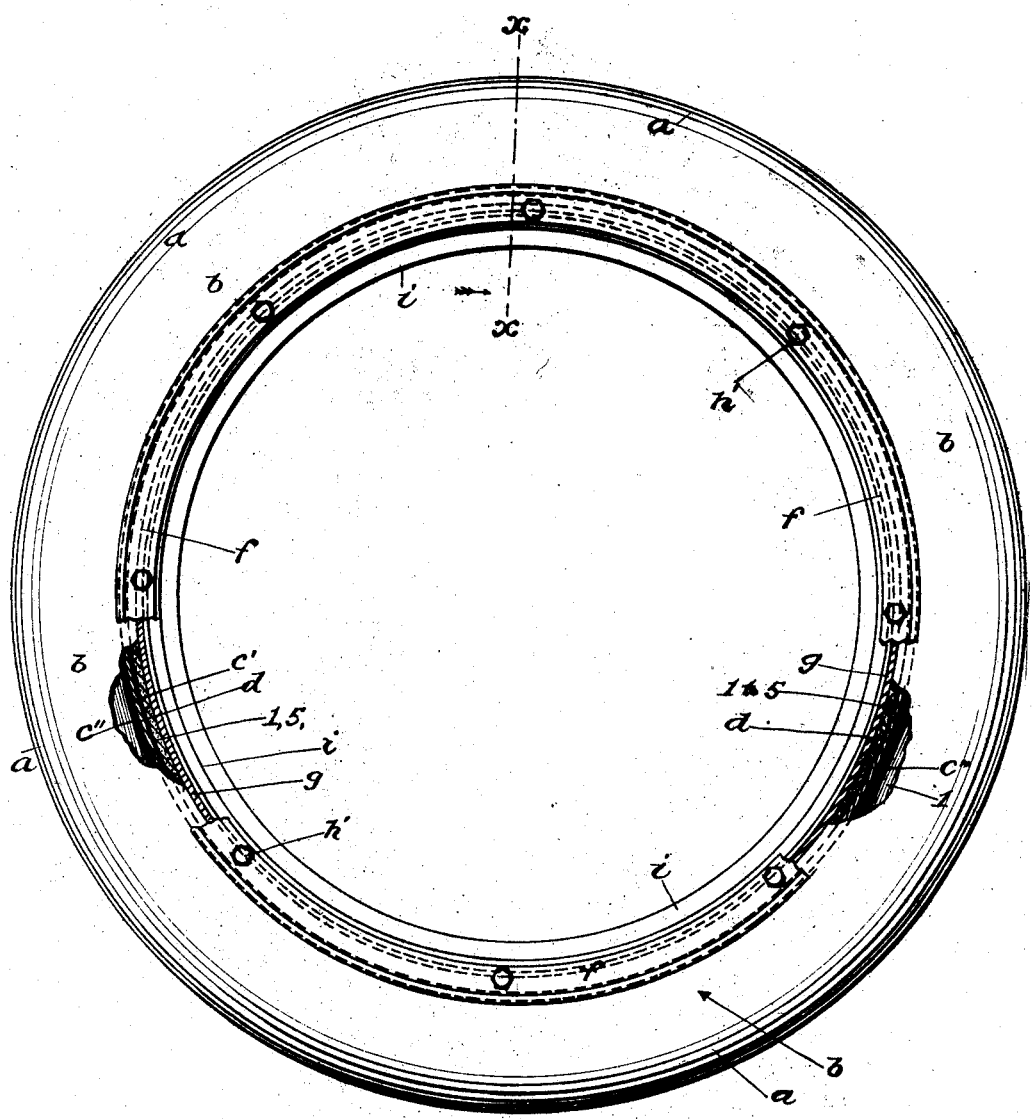

No. 865,326. PATENTED SEPT. 3, 1907.
E. K. BAKER & C. G. HAWLEY.
PNEUMATIC TIRE CASING OR SHOE.
APPLICATION FILED MAY 16, 1907.

2 SHEETS—SHEET 1.

Witnesses:
M. Simon
F. G. Knight

Inventors:
Erle K. Baker
Charles G. Hawley
by
Atty

No. 865,326. PATENTED SEPT. 3, 1907.
E. K. BAKER & C. G. HAWLEY.
PNEUMATIC TIRE CASING OR SHOE.
APPLICATION FILED MAY 18, 1907.
2 SHEETS—SHEET 2.
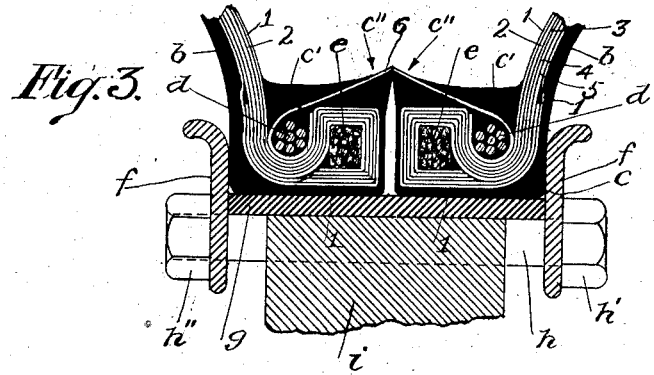
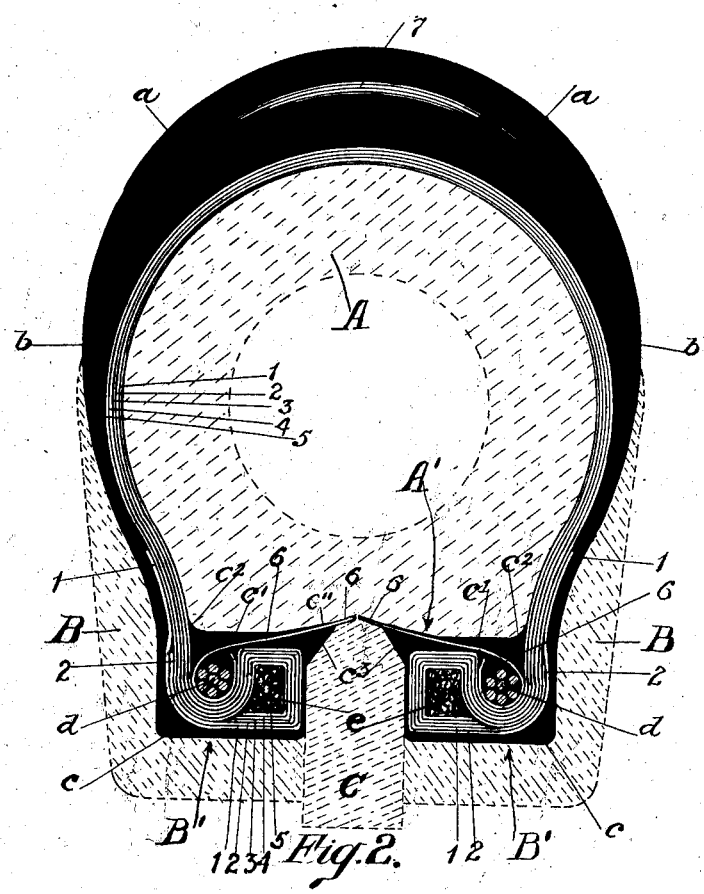
Witnesses:
M. Simon
F. G. Knight
Inventors:
Erie K. Baker
and Charles G. Hawley
by [signature]
Atty.

UNITED STATES PATENT OFFICE.

ERLE K. BAKER AND CHARLES GILBERT HAWLEY, OF CHICAGO, ILLINOIS.

PNEUMATIC TIRE CASING OR SHOE.

No. 865,326.  Specification of Letters Patent.  Patented Sept. 3, 1907.

Application filed May 18, 1907. Serial No. 374,375.

*To all whom it may concern:*

Be it known that we, ERLE K. BAKER and CHARLES GILBERT HAWLEY, citizens of the United States, and residents of Chicago, in the county of Cook and State of Illinois, have invented a certain new, useful, and Improved Pneumatic Tire Casing or Shoe, of which the following is a full, clear, and exact description, such as will enable others skilled in the art to make and use the same.

Our invention relates to improvements in pneumatic tire shoes or casings, and has special reference to improvements in the form and construction of the base portions or inner peripheries of such articles.

The primary object of our present invention is to improve the construction or make-up of pneumatic tire casings or shoes with a view to increasing the life or wearing qualities thereof and also with a view to increasing their efficiency when in use.

The particular object of the invention is to improve the construction of the base portions or inner flanges of pneumatic tire casing, to the end that the tearing or blowing out thereof shall be prevented, and with a further view to adapting the casing or shoe to more closely bind itself upon a wheel rim when inflated.

A further special object of our invention is to provide an improved pneumatic tire casing or shoe that shall be particularly adapted for use upon wheels which are equipped with so-called detachable rims.

Another object of the invention is to provide a pneumatic tire casing which shall be stronger than other casings, which shall have flanges or base portions that shall be inexpansible, and yet sufficiently flexible, and which, notwithstanding its special form and strength shall cost less rather than more than other casings.

Still further objects of our invention will appear hereinafter.

With these objects in view, our invention consists generally in a pneumatic tire casing or shoe which is provided with inwardly extending base flanges, in combination with inelastic non-stretchable rings or endless cables embedded in said flanges, upon the numerous layers of friction cloth or fabric, therein constituting portions of the casing.

Our invention also consists in various novel features constructions, and combinations of parts, all as hereinafter described and particularly pointed out in the claims.

Our invention will be more readily understood by reference to the accompanying drawings, forming a part of this specification, and in which Figure 1 is a side view of a wheel rim equipped with a tire casing or shoe embodying our invention, portions being broken away to better illustrate details of construction;—Fig. 2, is an enlarged cross section of our novel tire-casing or shoe;—Fig. 3, is a similar cross section of the base portions of the tire showing the same mounted upon the wheel rim, as upon the line X—X of Fig. 1 enlarged.

In these drawings we have shown our invention in the form which we consider the best. It should be remarked, however, that the form or construction which we prefer may be variously modified without departing from the spirit of the invention, which, therefore, is not confined to the specific details or forms herein shown.

This tire-casing or shoe when finished and ready for use is a unit or unitary structure; that is, its parts are so completely united by vulcanization that they cannot easily, if at all, be separated. In describing the make-up of the tire it is necessary to refer to the several portions thereof as though they were separate, but it should be borne in mind that this is not the case as all of the parts are substantially integral, even the cloth and metal being firmly united by the vulcanized rubber portions.

The portion of the tire which is of the largest diameter, is the tread portion, and the portions which are of the smallest diameter are the base portions, beads or flanges, these being connected to the tread portion, by the thinner side portions. The base portions of the tire casing are held upon the rim of the wheel when in use, as shown in Figs. 1 and 3.

Our tire casing, or tire, has two base portions, flanges, or feet so-called, which extend inwardly and meet on the central or middle plane. These base portions are of a thickness preferably exceeding the height of the flanges on the wheel rim, as indicated in Fig. 3. In each base portion we place or embed an endless metallic cable or ring, $d$. All of the courses or layers of friction cloth pass beneath these rings or cables, and the edges of the pieces of cloth are folded and formed in such manner as to make thick incompressible edges which lie within, *i. e.* at the inner sides of, the cables or rings; that is, each cable or ring lies between the heavy thickened or enlarged fabric formation and the outer side portion of the tire casing. The endless rings or cables are of very much greater size and strength than usual in tire casings and they are inelastic and non-stretchable. They are of greater diameter than the wheel rim, but are preferably of considerably less diameter than the rim flanges, $f$. It will be obvious, therefore, that when the casing has been set upon the rim in the manner shown in Figs. 1 and 3 it cannot be displaced by internal pressure or by side shocks, as the metallic rings cannot be forced over the flanges, and therefore absolutely prevent such stretching of the base portions as would permit them to pass over the rim flanges. In this manner we accomplish the first object of our invention; namely, the production of a tire casing, which, after being placed upon the wheel, cannot and will not be removed therefrom by any of the forces to which it is subjected in use.

As explained and as shown, the endless rings or cables are embedded and vulcanized in the base portions of our casing and cannot shift or move therein. The casing is made to fit the wheel rim snugly, but may be easily pushed off or onto the rim in the absence of one of the flanges. When the absent flange is replaced upon the rim and fastened thereon it operates to force the base portions of the casing together, and the latter being provided with flexible annular lips are driven together in such manner as to effectually close the joint between the base portions. This joint is further closed when the tire is inflated and if desired may be depended upon to hold the compressed air, though we prefer to always use an inner tube (not shown) in our casing. The inner edges of the base portions, being principally composed of friction cloth and suitable fillers, are practically inextensible and non-compressible, but they are, nevertheless, sufficiently contractible to be forced together and to hug the rim when subjected to the internal pressure of the inner tube. The combined effects of the hug or gripping of the rim in this manner, made particularly effective by the holding rings or cables, and the effect of the outward pressure of the base portions against the wheel flanges, effectually prevent the slipping of the inflated casing on the wheel rim, and this being obviated, what is called "rim cutting" is prevented. Thus the further objects of our invention are attained.

In connection with the subject matter of the next preceding paragraph attention is directed to the fact that the base portions of our rim are, as a rule, thicker or higher than the rim flanges; therefore, when the tire is deflated the sides thereof can at no time be forced or crushed against the said flanges. Furthermore, it will be noted that the base portions of our casing are faced with soft rubber which forms a bed for the tread portion of the casing, when deflated. We desire also that notice be taken of the fact that the sides of our casing, so to speak, spring or work from the points between the wheel flanges and the contained metal rings and there are no sharp turns or hinge portions which are subjected to flexure. The side portions of the casing may bend down close to the flanges, but will rarely, if ever, strike the edges thereof; and wearing, or attritional abrasion, of the parts of the tire upon each other is prevented by the masses and layers of vulcanized rubber connecting them throughout and forming, therewith, an integral structure.

Because the article is a unitary structure and because accurate descriptions of several sections of the casing, taken at different points, require the use of opposite terms, it is somewhat difficult to clearly set forth the form and make-up of the article except the method or process of making the tire casing be also described and except a definite section of the article be selected as representative of the whole. To this end we have represented by dotted lines in Fig. 2 the tire mold whereon the parts are assembled and will hereinafter make references to a section of the tire or casing (Fig. 2) taken at its top, as on the line X—X of Fig. 1. And, in referring to the drawings, and for the purpose of describing the parts of the casing and their relative positions or directions with respect to the wheel rim and the inner periphery of the casing, we shall refer to the direction away from the wheel rim as upward; to the direction toward the rim as downward; to the direction toward the central plane as inward; and, to the opposite direction as outward. These terms are strictly appropriate only to a section of the casing taken at the top thereof but they will nevertheless serve the same purpose in indicating points or directions in any other cross-section of the endless or annular tire casing or shoe.

Referring now to the drawings, and particularly to Fig. 2;—A, represents the circular inner portion or core part of the tire mold.

C, represents the central or mid portion of the mold and, B, B, the two outer sections of the mold.

The bottom or inner periphery of the core, A, contains a groove which receives the edge of the mid portion, C. Only part of the V shaped groove is occupied by the member C and the edges of the latter are chamfered or beveled, the two parts presenting converging walls for the formation of the flexible lips, $c^3$, before referred to. The inner periphery, A', of the core and the annular surfaces or peripheries, B', of the mold sections, B, B, are separated by considerable spaces, separated by the mid section, C, and wherein the base portions of the tire or casing are vulcanized and given shape. With the exception of the wide V-shaped groove, the bottom surface, A', of the core is flat; the core, however, being rounded at the corners or edges, as at, $c^2$, so that the soft rubber is made to merge properly with the inner course or layer of fabric, sharp angled junctions being avoided. It will be noted that the cables or rings $d$ occupy positions substantially equidistant from adjacent side and bottom walls of the respective mold parts B, and likewise are substantially equi-distant between the surfaces A', and B'. The locations shown are preferred but may be changed within reasonable limits according to the detailed make-up of the base portions. The outer sections of the mold are applied and bolted in place only after the structure has been built up on the core A and the mid section C, that is, just before the raw casing or tire is placed in the vulcanizer. The wrappings used for forming the tread portion are wrapped on over the tire and the mold in the usual manner, or, an outer tread molding section may be substituted for the wrappings.

Having defined the nature, positions and parts of our novel casing we will now describe the manner of constructing the same, in order that others may fully understand the manner of carrying the invention into effect. The mid section C of the mold may be integral with the core A, if desired, but we find it better when separate, as by removing it the stripping of the completed, vulcanized casing from the core is facilitated. For like reasons we form the core and the mid piece in sections. The cloth which we use in our casing is the so-called friction cloth, which is well-known in the art, being fabric which is impregnated with rubber. When rubber is mentioned herein the word is intended to define a gutta percha composition or equivalent material. The first act in building up our tire consists in applying a strip, 6, of friction cloth to the bottom or base of the core, the strip being wider than the same. This strip is then bound in place by means of the mid piece, C, from which latter spokes extend to a central hub (not shown) whereby the mold is conveniently supported. The strip, 6, is afterward severed into two parts by being cut along the central groove of the core, as shown in Figs. 2 and 3. When the fabric, 6, has been secured in place the soft rubber fillers, $c^1$, are placed on the bottom of the mold, and the cloth is pressed down upon the same. The soft rubber fillers from which the lips $c^3$ are formed are then pressed into place upon the fabric, 6, whereupon the tiremaker is ready to place the endless cables or rings, $d$, upon the mold. These rings are placed within the ring or collar formed by the strip of fabric, 6, and the edges of said strip are crimped down over and around the cables or rings, $d$, as well shown in Figs. 2 and 3. Before the cables are placed, they are thickly coated with rubber, and the folded or crimped fabric holds them firmly enough to permit the main layers or courses of fabric to be laid and formed thereon with ease and rapidity, and without detrimentally displacing the cables.

Little difficulty attends the temporary fastening of the cables to the core, $a$, but we find it better to loosely hold them in place by means of the strips of fabric, 6, thereby allowing the rings or cables to shift or float slightly with respect to the core, while the main courses of fabric are being formed into place between the cables and the mid piece, C. It is also easier to force the filling material, $e$, into the folds or loops of the main layers of canvas when the rings $d$, are free to move, and no harm results from the temporary displacement of the rings, for the reason that all parts of the base portions are forced into their proper places when the outer sections, B, B, of the mold are driven on and bolted against the mid-piece or ring, C. It may here be mentioned that the strips of fabric, 6, serve four purposes; first, they temporarily hold the metal rings or cables, in the manner explained;—second, the strips, 6, permanently inclose the cables, helping to hold the same and relieving the main layers or courses of fabric from any possible abrasion thereby;—third, the strips, 6, traverse the spaces above or outside of the cables and prevent the disruption of the masses of rubber therein;—and fourth, the inner edges of the strips, 6, effectually strengthen the flexible lips, $c^3$, and prevent the tearing thereof by the workmen's mold stripping tools or when inner tubes are being placed in or taken from the casing. When the mid strip has been removed and before the tire is taken from the core, the strip, 6, may be severed into two parts by a single cut, leaving the edges to project as in Fig. 2, or the edges may be trimmed off short as shown in Fig. 3. In either case, firm, fine edges $C''$ are formed on the joint closing lips, $c^3$.

We have herein referred to the cables as being of metal, but other non-stretchable material may be substituted. We much prefer a solid metal ring, or a metal cable composed of heavy strands as in Figs. 2 and 3, and the cable is considered best because it is slightly more flexible in lateral directions and because the rubber works between the strands and more firmly unites the cables with their cloth inclosures or envelops. When the strip, 6, the rubber fillers, and the cables have been applied to the mold in the manner explained the first course or layer of fabric, 1, is stretched on the mold core A, and its edges are folded inwardly around the respective cables. The edges are carried up to points above the cables and thence across to the mid strip, C, and thence down alongside the mid strip, where they are left temporarily. The other courses or layers, usually four in number, (indicated by numerals 2, 3, 4, 5) are then applied in like manner and are pressed firmly into engagement with the folds or loop portions of the first layer. All are temporarily laid against the mid piece, C, until the fillers $e$, are forced into the folds or loops between the cables and the mid strip. These fillers may be made of hard rubber or of rope or of folded pieces of cloth, and when they have been placed the edges of the layers, 1 to 5 are folded across them. As shown in Figs. 2 and 3, we prefer that the edges of the three outer layers, 3, 4, and 5, shall simply extend across the fillers, whereas, layer No. 2 is carried outward and upward to substantially the height of the rim flanges, and the edges of the first or inner layer, 1, are carried up on the outside to higher points, for the purpose of strengthening the lower parts of the side, $b$, of the casing. When thus far completed the structure is ready for the application of the rubber coating or envelop. This, according to the best practice is built up of relatively thin layers of slightly vulcanized rubber, many thereof being pressed or rolled into place to form the thick tread portion, $a$, and the interference strips, 7, being applied between the courses in the usual manner. We prefer to carry the side sheets, $b$, of rubber down to the base flanges to form the neat corners or angles, $c$, at the base, as shown in Fig. 2. The crude or raw casing or shoe is now ready for vulcanizing and the outer mold parts, B, having been fastened into place the wrappings are applied and the whole placed in the vulcanizer. When removed from the vulcanizer the wrappings and the mold sections, B, B, are taken off, and the parting or mid strip, C, is disengaged and removed, after which the strip, 6, is severed with a knife, whereupon the tire may be readily stripped off the core. It is then ready for use.

In Fig. 3, we have shown our tire mounted upon a rim which is especially adapted to receive it. This comprises a flat rim, $g$, on the felly, $i$, together with two flange rings, $f$, and bolts, $h$, which pass through the rings, $f$. Each bolt has a head, $h'$, and a nut, $h''$, and the bolts pass through notches provided therefor in the felly, engaging the inner side of the rim, $g$, for sake of rigidity.

Having thus described our invention we claim as new and desire to secure by Letters Patent:—

1. A tire casing provided with inwardly extending base portions which meet at their inner edges and have endless metal rings embedded in their outer parts and coöperating fillers embedded in their inner parts, substantially as described.

2. A tire casing having inwardly extending base portions adapted to abut, and containing endless cables in their outer parts and coöperating fillers $e$, $e$, in their inner parts, substantially as described.

3. A tire casing provided with inwardly extending base portions adapted to abut, and having endless cables embedded in their outer portions and coöperating fillers embedded in their inner portions, substantially as described.

4. A tire casing comprising a number of layers or courses of fabric and a cover of rubber, said casing having inwardly extending base portions, metal rings embedded in said base portions, and said layers or courses passing beneath said rings and having their edges formed into substantially incompressible thickened portions to co-act with said rings, the whole being vulcanized, substantially as described.

5. An article of the class mentioned comprising a number of layers of fabric, and a covering of rubber, and formed with inwardly extending base portions the edges of said layers being wrapped about suitable fillers in said base portions and therewith forming substantially incompressible inner edges for said base portions, and endless rings of less diameter than said inner edges embedded in the outer parts of said base portions, and each composed of a plurality of strands of non-stretchable material, substantially as described.

6. An article of the class described comprising a number of layers or courses of fabric, in combination with endless metal rings, ring-like fillers parallel with respective rings, the edges of the fabric being carried downward and upward around said metal rings, and thence inward, downward and outward around respective fillers, rubber fillers enveloping said rings, a covering of rubber forming a tread portion, the whole vulcanized and comprising a unitary structure, substantially as described.

7. A tire casing having thick inwardly extending base portions or flanges, endless metal rings embedded in the outer parts of respective base portions, respective coöperating fillers in the inner parts of said base portions the inner edges of said base portions being provided with flexible joint closing lips, and the whole constituting a unitary structure, substantially as described.

8. A tire casing comprising a number of layers or courses of fabric, and a covering of rubber forming a tread portion, sides, and inwardly extending base portions having flexible lips and separate strips of fabric embedded in said lips, as and for the purpose specified.

9. A tire casing comprising a number of layers or courses of fabric, metal rings, the edges of said layers being carried downward and thence inward and upward around said rings, separate pieces of fabric closing the spaces above said rings, and suitable fillers and coverings, the whole vulcanized and forming a unitary structure, substantially as described.

10. A tire casing or shoe comprising a number of layers of fabric, and a covering of rubber, and formed with inwardly extending base portions, and endless metal rings embedded in said base portions said layers passing beneath said rings in respective base portions, rising at the inner sides thereof and formed into substantially incompressible inner edges, substantially as described.

11. A tire casing or shoe comprising a number of layers of fabric together with endless metal rings and a covering of rubber, and formed with inwardly extending base portions, said layers passing beneath said rings in respective base portions, rising at the inner sides thereof, and making the edges of the base portions substantially incompressible, and separate pieces of fabric enveloping said rings and embedded in respective base portions, substantially as described.

12. A tire casing comprising a plurality of layers or courses of fabric, and a covering of rubber, said casing having inwardly extending base portions or flanges, endless metal rings embedded in said base portions, fillers in said base portions, the edges of said layers of fabric all passing beneath respective rings and vulcanized upon said fillers, and the inner course or layer of fabric, having its edges extended outwardly and upwardly at the outer sides of the casing, the whole being vulcanized and constituting a unitary structure, substantially as described.

13. A tire casing comprising fillers, $c^1$, strips of fabric, 6, 6, endless metal rings enveloped by the edges of respective strips, a plurality of courses or layers of fabric, a tread portion and covering of rubber, the edges of said layers of fabric being passed downwardly beneath said rings and bent upwardly and inwardly, forming incompressible base edges, and the whole being vulcanized and constituting a unitary structure, substantially as described.

14. A tire casing or shoe, comprising a plurality of layers or courses of fabric, in combination with endless metal rings, ring-like fillers parallel with respective rings, the edges of the layers of fabric being carried downward and inwardly beneath said rings and thence upwardly and downwardly around said fillers, separate strips of fabric extending inwardly from said rings and therewith embedded in soft rubber, the whole being vulcanized and comprising a unitary structure, substantially as described.

15. A tire casing or shoe, comprising a plurality of layers of fabric and the edges of which are formed into inwardly extending base portions, together with endless metal rings embedded in said base portions, said layers passing beneath the rings in respective base portions, rising at the inner sides thereof and making the inner edges of said base portions substantially incompressible, inwardly extending lips of rubber projecting from said inner edges of the base portions and separate pieces of fabric embedded in said lips, the whole being vulcanized and forming a unitary structure, substantially as described.

16. A tire casing or shoe, comprising a plurality of layers of fabric and a covering of rubber, the edges of said layers of fabric being formed into inwardly extending base portions or flanges, endless metal cables embedded in respective base portions, the edges of said layers of fabric being passed downwardly beneath respective cables and thence upwardly at the inner sides thereof and thence downwardly, fillers coöperating with the edges of the layers to form substantially incompressible inner edges for said base portions and separate strips of canvas covering said cables and extending therefrom to the inner edges of the base portions, the whole being vulcanized and forming a unitary structure.

In testimony whereof, we have hereunto set our hands, this 4th day of May, 1907, in the presence of two subscribing witnesses.

ERLE K. BAKER.
CHARLES GILBERT HAWLEY.

Witnesses:
M. SIMON,
A. W. NELSON.